Jan. 16, 1962  F. W. ROHE  3,016,578
MOLDABLE INSERT PANEL AND METHOD OF ASSEMBLY
Filed Dec. 11, 1957
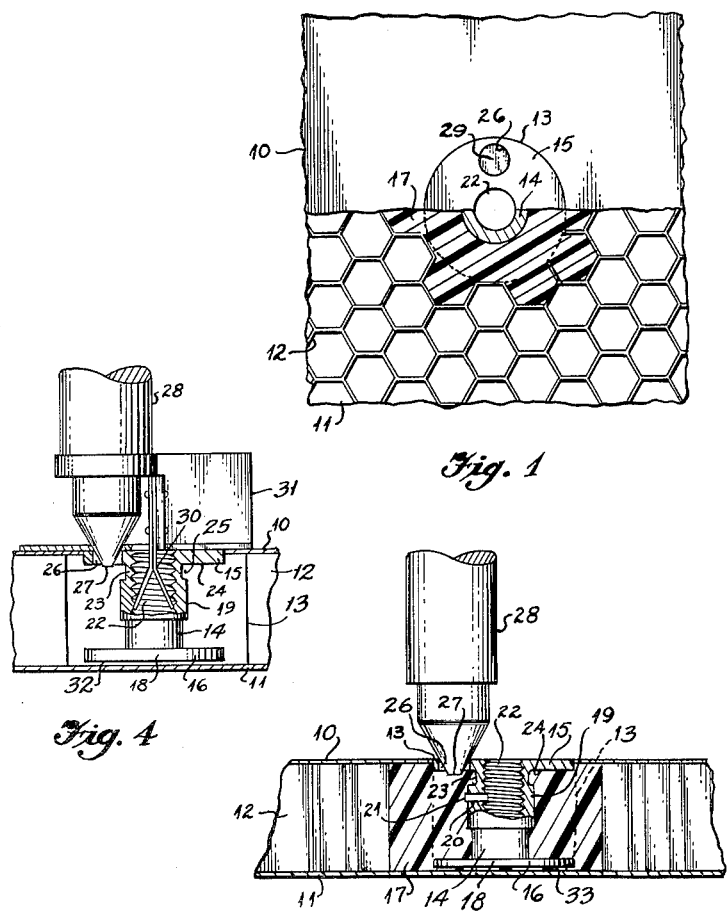
INVENTOR.
FREDERICK W. ROHE
BY
ATTORNEY

United States Patent Office 3,016,578
Patented Jan. 16, 1962

3,016,578
MOLDABLE INSERT PANEL AND METHOD
OF ASSEMBLY
Frederick W. Rohe, 879 S. East St., Anaheim, Calif.
Filed Dec. 11, 1957, Ser. No. 702,009
1 Claim. (Cl. 18—59)

This application is in part a continuation of my abandoned application S.N. 346,950, filed April 6, 1953, for Flanged Insert Nut for Panels, my pending application S.N. 373,133, filed August 10, 1953, for Internally Threaded Insert Anchor Element, and my pending application S.N. 641,620, filed February 21, 1957, for Sandwich Panel and Flanged Insert Nut Assembly, now Patent No. 2,880,830.

This invention relates to internally threaded anchor elements, such as anchor nuts for insertion in panels to which other parts are to be secured by means of screws, particularly characterized by the use of a molded material surrounding the nut and disposed in a cavity or hole in the mounting panel and adapted to resist rotation in response to torque applied as by the threading of the screw element into the nut. Such anchor elements have come to be referred to commonly in the trade as "moldable inserts," and the general object of the present invention is to provide improvements in such panel and insert assemblies and particularly in the method of anchoring the insert in the panel cavity.

The invention is particularly directed to the problem of anchoring an insert in a hole or cavity in a panel of lightweight structure (such as is commonly used in the interior wall construction of airplanes) wherein a pair of sheet metal skin sheets are attached to opposite sides of a light-weight core (e.g. of honeycomb metal construction) which is of relatively soft and fragile character such that a direct threaded connection of a screw therein would not hold satisfactorily. A particular object of the invention is to provide an improved method of anchoring an insert in such a panel.

Another object is to provide an improved anchor nut especially adapted for being mounted in such a panel by my improved method.

Another object is to provide an improved combination of light-weight sandwich type panel, anchor nut disposed in a flush relation in a hole in the panel, and a molded body covering the hole, embedding the anchor nut therein, and constituting a portion of the exposed area of the anchor nut. More particularly, the invention aims to provide such a combination wherein a flange of the nut and a small portion of the anchoring material cooperatively present a complete closure for the outer end of the hole in the panel.

A further object is to provide such an anchor nut having means cooperable with the wall of the hole to center the inner end of the nut in coaxial relation to the hole, said means also cooperating with the molded anchoring body to hold the nut against rotation in the hole. Thus it is possible to utilize a cylindrical bore as the hole which receives the nut.

Another object of the invention is to provide such a nut with improved means functioning triply to: (1) lock a screw to the nut to restrain undesired unthreading in the presence of vibration; (2) reinforce the wall of a reduced stem portion of the nut between the ends thereof; and (3) assist in retaining the nut against pulling out of the molded anchoring body in which it is embedded.

More specifically, to the end that the structure of the anchor nut may be of maximum simplicity, the invention contemplates the combination of the thread locking function and the locking of the anchor nut in the molded mounting body, in a single structural feature of the anchor nut, i.e. the utilization of a common structural part to obtain both functions.

Other objects and advantages will become apparent in the ensuing specification and appended drawing in which:

FIG. 1 is a plan view, partially in section, of a panel and insert assembly embodying the invention;

FIG. 2 is a cross sectional view of the same showing the method of inserting the plastic anchoring mass;

FIG. 3 is a cross sectional view of a panel embodying a modified form of the invention; and FIG. 4 is a side view of a modified form of the invention.

Referring now to the drawing in detail, I have shown therein, as an example of one form in which the invention may be embodied, an assembly comprising a panel consisting in spaced parallel skin sheets 10 and 11 and a cord 12, the panel being provided with a hole 13 which extends through one of the skin sheets (e.g. sheet 10) and bottoms against the inner surface of the other skin sheet 11; an anchor nut comprising a stem or body 14 and heads 15 and 16; and a molded anchoring body 17 in which the nut is embedded, the body 17 filling the hole 13 and anchoring the nut therein.

The panel is of a lightweight type commonly used in finishing the interior of airplanes having maximum lightness as a primary requisite. Such panels are also used in flooring, fuselage skin structure, and wing skin structures. They are well known, and are particularly characterized by attaining lightness in weight through the low density characteristic of the cellular core 12, while attaining strength in the skin sheets 10 and 11 which are commonly of sheet metal (e.g. sheet aluminum).

In such a panel, the central body or core 12 is commonly constructed of extremely lightweight aluminum ribbon material (foil) which, because of the honeycomb cell structure thereof (the parallel axes of the cells being normal to the planes of the skin sheets 10 and 11) provide adequate strength in the aggregate over the entire area of the panel (due to the extremely large number of cells of quite small diameter) to bind the two skin sheets together in a fairly rigid but extremely lightweight sandwich construction.

Such panels have greatly improved airframe structure by reducing weight and providing added heat insulating effectiveness, but such improvement has introduced added difficulties in the problem of securely attaching such panels to the frame structure of an aircraft fuselage, and of attaching other parts to the panels. These difficulties include not only the tendency for the attached parts to pull loose from the panels, but also to damaging of the panel surface where fasteners are riveted or otherwise forcibly attached to the panel. Prior to the present invention, there was no available fastener device that was satisfactory to meet these problems.

Referring now to the insert in the form shown in FIG. 2 the body 14, for at least a majority of its length, comprises a cylindrical stem which is integrally joined to bottom head 16. Head 16 is in the form of a radial flange having a diameter to snugly fit the cylindrical wall of the hole 13 at the bottom thereof, and having diametrically opposite sides thereof provided with chordal flats 18 which are engaged by the anchor body 17 to grip the nut against rotation. Outer head 15, on the other hand, is circular, preferably having a cylindrical rim surface to closely fit and close the circular aperture in the skin sheet 10. The axial length of the insert is related to the thickness of the panel so that with the bottom head 16 seated upon a thin pad 33 adhering to the skin 11 (FIG. 2) or seated directly upon skin 11 (FIG. 3) the outer face of the outer head 15 will be flush with the outer surface of the skin sheet 10.

The body 14 may either be of the same diameter throughout its length (FIG. 3) or it may embody an annular boss 19 of enlarged diameter adjacent the outer head 15 (FIG. 2). The boss 19 is preferably spaced from the head 15 by a reduced neck 23 and thus may present an annular shoulder 24 facing the head 15, and an annular groove 25, in which the anchoring body of plastic material bears to restrain the nut from pulling out of the hole 13. In this form of the invention, the annular boss 19 may further function to support a locking plug 21 press-fitted in a radial bore 20 extending through the boss into communication with the threaded axial bore 22 of the body 14. The locking thread 21 is of a tough, moderately hard material such as hard fiber, relatively unplasticized thermoplatsic synthetic resin material, Nylon, etc., and is adapted to engage the head of a screw which is threaded into the bore 22 with a frictional engagement such as to hold the screw against unthreading in the presence of vibration.

In the alternate form of the invention shown in FIG. 3, the body 14a may be directly joined to the head 15 by a reduced neck 23a defined by an annular groove 25a in which the plastic material may grip a shoulder 24a defined on the adjacent end of the body 14a.

Anchoring body 17 is of a plastic material. It is a molded body and in the complete assembly as shown in FIG. 1, it fills the hole 13, is molded around the anchor nut, and is solidified so as to grip the chordal flats 18 of the bottom flange 16 and to restrain the nut against rotation in the hole. These conditions can be attained by use of a plastic material that is sufficiently fluid to be inserted into the hole 13 by standard molding practice (e.g. by pouring the material in a liquid form into the hole, and subsequently solidifying the molded material), using any standard procedure for curing or hardening it from its initial liquid or softened state to its final solidified state. The essential characteristic of the invention is that the molding process be such that the plastic will be completely fill the hole 13 and surround the anchor nut so as to securely grip it when it becomes solidified.

Since the heads 15 and 16 are both fitted to the cylindrical wall of hole 13, the nut will be coaxially related to the hole and, assuming that the latter has been accurately bored with its axis normal to the surfaces of the panel, the nut will likewise have its threaded bore in such normal relation.

In the improved insert of the present invention, the flange 15 is provided with a small aperture 26 to receive the tip of a conical nozzle 27 on a gun 28 for injecting the plastic material 17 while in a soft, relatively flowable state. In the improved method of mounting the insert in the panel in accordance with the present invention, the insert is first attached to the gun 28 by means of a spring clip 30 and a gauge bracket 31. Clip 30 has a pair of spreading fingers adapted to yieldingly engage the thread of the insert so as to establish a supporting attachment of the insert, locating the same against the bottom face of bracket 31, which constitutes a gauge surface. The latter is adapted to seat against the panel skin 10 to accurately position the insert for depth as it is inserted into hole 13.

In the preferred form of the invention (FIGS. 2 and 4) the insert is somewhat shorter than the depth of hole 13 (the spacing between the inner faces of skin sheets 10, 11) whereby a small space 32 is left between the bottom of the insert and bottom skin 11. This space becomes filled with the plastic material 17 to form a supporting pad 33 (FIG. 2) between the insert and skin 11, which pad adheres to the hole bottom and improves the connection between the insert and the panel, considerably increasing the load-bearing connection between the two, i.e., the capacity of the assembly to resist the tearing or displacement of the insert from its fixed position in the panel. The flats 18, being disposed radially inwardly of the areas of maximum radius of the periphery of head 16 (the circular segments thereof) constitute anchor areas for interlocking engagement with the anchoring body 17.

As the insert is attached to the clip 30 as above described, the tip of the gun nozzle 27 is inserted in the aperture 26 and seated against the circular outer edge thereof so as to establish a seal while holding the insert firmly in position in the hole. After positioning of the insert in hole 13, the gun is operated to inject the soft plastic material through the aperture 26 into the annular space surrounding the insert within the hole 13. As the gun nozzle is withdrawn from the aperture 26, a small gob of the plastic material will remain bulging outwardly through the aperture 26. The excess portion of this gob of material is scraped off with a suitable putty knife or the like, leaving a thin plug 29 of the plastic material filling the aperture 26 and having a flat outer face constituting a continuation of the flat outer face of the head 15, flush with the outer surface of the skin sheet 10.

The invention may utilize any moldable plastic material which is relatively soft and moldable when initially applied and which hardens or sets after application so as to establish a firm rigid bond between the insert and the structure of the panel. For example, an epoxy resin in paste form, mixed with a suitable chemical curing agent so as to set in a hard, rigid body when allowed to stand over a period of time, may be utilized. Alternatively, a pasty plastisol resin which is initially relatively soft and flowable and which may be hardened or cured by the application of heat after it has been injected, may be utilized. Or a plastic resin softened by a liquid solvent which will later evaporate, may be utilized.

The form of the invention shown in FIG. 3 may utilize an all metal thread lock consisting in a slight reduction in diameter in the reduced neck 23a such that the threads 22 in the local area of neck 23a are of slightly smaller diameter than the remaining threads, and will therefore establish an interference fit with the threads of the screw or bolt which will stretch the neck 23a slightly as it is threaded therethrough, thus establishing a constricting frictional lock between the nut and bolt threads.

I claim:

In the fabrication of a composite lightweight panel and insert assembly wherein an insert comprising a pair of heads of radial flange form one of which has a circular periphery, and a body of reduced diameter extending between and integrally joining said heads and provided with an axial bore to receive a securing element, is mounted in a hole in a panel sandwich structure comprising a lightweight core and skin sheets attached to respective sides thereof, with said hole having a bottom defined by one of said skin sheets, the method of mounting said insert nut in said hole comprising: providing, in said one head, an aperture located radially outwardly of said body; providing in the periphery of the other head, anchor areas disposed radially inwardly of the areas of maximum radius of said periphery; attaching said insert to an injection gun, with the nozzle of the gun sealed in said aperture and with a guide on the gun engaging the outer face of said one head, and extending laterally beyond said one head; inserting said insert in said hole with said one head fitted in that portion of the hole which is defined in said other skin sheet, with said guide resting against said other skin sheet to position said insert for depth in said hole, and with said other head thereby axially spaced from said hole bottom, so as to provide (a) a thin flat bottom space between said other head and said hole bottom, (b) an annular cavity between the lateral wall of said hole and the lateral surface of said nut body and between said heads, and (c) passages between said anchor areas and said hole wall, said passages providing communication between said annular cavity and said bottom space; then injecting under pressure through said aperture into said annular cavity and thence through said passages into said bottom space, a softened synthetic resin plastic material adapted to subsequently harden; and thereafter releasing said yielding connection and removing said injection gun and causing said plastic material to harden in said annular cavity and passages and bottom space so as to provide anchoring connections between said insert and said bottom and lateral wall of the hole, with said plastic material locked against said anchor areas to hold the insert against rotation.

References Cited in the file of this patent

UNITED STATES PATENTS

| | | |
|---|---|---|
| 844,944 | Jacobs | Feb. 19, 1907 |
| 1,642,989 | Busch | Sept. 20, 1927 |
| 2,255,184 | Osenberg | Sept. 9, 1941 |
| 2,304,718 | Swart | Dec. 8, 1942 |
| 2,406,201 | Trump et al. | Jan. 25, 1949 |
| 2,502,970 | Manning | Apr. 4, 1950 |
| 2,585,557 | Kreimendahl | Feb. 12, 1952 |
| 2,672,173 | Chantler | Mar. 16, 1954 |
| 2,880,830 | Rohe | Apr. 7, 1959 |